United States Patent [19]

Firey

[11] 4,381,745

[45] May 3, 1983

[54] POROUS BURNER DIESEL ENGINE

[76] Inventor: Joseph C. Firey, P.O Box 15514, Seattle, Wash. 98115

[21] Appl. No.: 416,455

[22] Filed: Sep. 9, 1982

Related U.S. Application Data

[63] Continuation-in-part of Ser. No. 138,988, Apr. 10, 1980, abandoned.

[51] Int. Cl.³ .................... F02B 45/10; F02D 19/00
[52] U.S. Cl. ............................... 123/294; 123/1 R; 123/23
[58] Field of Search ............ 123/1 R, 143 R, 657, 123/668, 669, 268, 270, 271, 272, 294, 298, 23; 60/39.52

[56] References Cited

U.S. PATENT DOCUMENTS

| | | | | |
|---|---|---|---|---|
| 2,624,172 | 1/1953 | Houdry | ............................ | 60/39.52 |
| 2,632,296 | 3/1953 | Houdry | ............................ | 60/39.52 |
| 3,777,718 | 12/1973 | Pattas | ................................ | 123/268 |
| 3,923,011 | 12/1975 | Pfefferle | ............................ | 123/1 R |
| 4,011,839 | 3/1977 | Pfefferle | ............................ | 123/1 R |
| 4,333,423 | 6/1982 | Firey | .................................... | 123/23 |

FOREIGN PATENT DOCUMENTS 282830 10/1952 Switzerland ....................... 123/1 R Primary Examiner—Charles J. Myhre
Assistant Examiner—Carl Stuart Miller

[57] ABSTRACT

In the engines of this invention the fuel is spread out over the interior pore area of a porous burner volume and the large area of contact with air needed for rapid burning is obtained in this way. The fuel may burn in three ways: partial burning of evaporated fuel in the pore spaces; partial burning of solid carbon fuel deposits in the pore spaces; complete burning of the partial oxidation products outside the pore spaces during expansion. Several engine cycles can be used to burn up any solid carbon deposits formed from the fuel so these engines can efficiently utilize high viscosity residual fuels and slurries of solid char fuels in oil even at very small piston diameters.

13 Claims, 9 Drawing Figures

SECTION A-A OF FIGURE 3

POROUS BURNER DIESEL ENGINE

CROSS REFERENCES TO RELATED APPLICATIONS

This application is a continuation-in-part of my earlier filed patent application entitled, "Porous Burner Diesel Engine," Ser. No. 06/138988, filing date Apr. 10, 1980, now abandoned, Group Art Unit 342, and differs therefrom primarily in also encompassing, the use of excess steam for engine stopping, the use of steam stratification, and the use of ash volatility additives in the fuel.

The invention described herein is related to the inventions described in the following United States patent applications by the same inventor:

1. "Char Burning Engine," Ser. No. 06/042441 filing date May 25, 1979, Group Art Unit 342, now abandoned.
2. "Char and Oil Burning Engine," Ser. No. 06/083607, filing date Oct. 11, 1979, Group Art Unit 342, now abandoned.
3. "Cyclic Char Gasifier," Ser. No. 06/121973, now abandoned, filing date Feb. 15, 1980, Group Art Unit 173.
4. "Engine Steam Stratifier," U.S. Pat. No. 4,333,423.
5. "Improved Char and Oil Burning Engine," Ser. No. 06/183182, now abandoned, filing date Sept. 2, 1980, Group Art Unit 342.
6. "Char Burning Free Piston Gas Generator," U.S. Pat. No. 4,372,256, filing date May 14, 1981, Group Art Unit 342.
7. "Improved Cyclic Char Gasifier," Ser. No. 06/328148, pending, filing date Dec. 7, 1981, Group Art Unit 173.

BACKGROUND OF THE INVENTION

1. Field of the Invention

This invention is in the field of internal combustion engines and particularly the field of internal combustion engines capable of running efficiently on high viscosity, residual type petroleum fuels or other similar high viscosity liquid fuels, with any values of engine piston diameter.

2. Description of the Prior Art

Prior art diesel engines are capable of burning high viscosity, residual type fuels, such as Bunker C fuels, but only in engines of large piston diameter and hence of low engine speed and high engine weight. This deficiency of prior art diesel engines results from the use of a high-pressure injector to atomize the liquid fuel in order to spread the liquid out over the large area of contact with air needed for rapid burning. Increasing fuel viscosity retards atomization but this effect can be offset by using higher fuel injection pressures. Fuel viscosity and injection pressure can be increased in this way but only up to the point where the liquid fuel is sprayed on to the combustion chamber surface since such fuel impingement destroys the needed atomization. In this way for each engine piston diameter, or injection path length, there exists a maximum useable injection pressure and a corresponding maximum useable fuel viscosity. Hence we find small piston diameter truck and bus diesel engines requiring low viscosity fuels whereas large piston diameter marine diesel engines can use residual type fuels efficiently. Necessarily then high viscosity fuels are useable only in prior art diesel engines which are too heavy for use in trucks, buses or railroads since large piston diameter requires a low engine RPM to keep inertia forces reasonable and hence requires a high engine weight per horsepower.

This deficiency of prior art diesel engines has not been important in the past when low viscosity diesel fuels were readily available at low prices. But this is no longer the case and it is now important to seek to utilize all kinds of liquid fuels for those transportation applications, such as trucks and buses, whose refueling and fuel handling requirements necessitate use of easily handled liquid fuels and make undesireable the use of difficult to handle solid fuels. These are also the transportation applications which require light-weight engines and hence require diesel engines of small piston diameter. It would be a great benefit to have available small piston diameter, light-weight engines capable of efficiently burning high-viscosity, residual-type fuels.

Stationary power plants and industrial furnaces are already being shifted from the residual petroleum fuels used heretofore to coal and other solid fuels, which they can handle, as a petroleum conservation measure. But these residual petroleum fuels thus released cannot readily be used elsewhere and particularly cannot be used in the important transportation applications requiring light-weight engines. This petroleum utilization problem would also be solved if small piston diameter, light-weight engines were available which could run on residual petroleum fuels.

Certain mechanical portions of the internal combustion engines of my invention are already well known in the prior art such as the pistons, cylinders, crankshafts, etc. The term "internal combustion engine" is used hereinafter and in the claims to mean these already well known combinations of cylinders, cylinder heads, pistons operative within said cylinders and connected to a crankshaft via connecting rods, valves and valve actuating means or cylinder ports, cams and camshafts, lubrication system, cooling system, ignition system if needed, flywheels, starting system, fuel supply system, fuel air mixing system, intake pipes and exhaust pipes, superchargers, torque control system, etc., as necesary or desired for the operation of said internal combustion engine. The term "internal combustion engine" is used hereinafter and in the claims to include also the already well-known combination as described above but wherein the cylinders, cylinder heads, pistons operative within said cylinders and connected to a crankshaft via connecting rods, valves and valve actuating means or cylinder ports, are replaced by a rotary engine mechanism combination, comprising a housing with a cavity therein, and plates to enclose the cavity, a rotor operative within said cavity and sealing off separate compartments within said cavity and connecting directly or by gears to an output shaft, ports in said housing for intake and exhaust, such as in the "Wankel" type engine. An internal combustion engine may be of the four stroke type, wherein for each cylinder two full engine revolutions or processes are required to complete a single engine cycle of intake, compression, combustion, expansion and exhaust, or alternatively may be of the two-stroke type wherein a single engine cycle is completed, for each cylinder, within a single engine revolution or process, as is well known in the art of internal combustion engines.

The term, "internal combustion engine mechanism," is used herein and in the claims to mean all those portions of an internal combustion engine, as described hereinabove, except the fuel supply system, the fuel air mixing system, the torque control system, and any spark ignition apparatus. The term, "piston and cylinder," is used herein and in the claims to mean these elements as commonly used in piston and cylinder engines, and also includes the functionally corresponding elements as used in other engine types such as the Wankel engine, and further includes cases where more than one piston is used in a single cylinder. The term engine cylinder is used herein and in the claims to include also the cylinder head if used.

The term high viscosity residual fuel is used herein and in the claims to mean any fuel which can flow under a pressure difference or can be made to thusly flow when adequately warmed, and whose resistance to such flow is appreciably greater than that of a distillate diesel fuel such as number two diesel fuel, and which can be burned with air. Most commonly today such high viscosity residual fuels are derived from crude petroleum and contain those petroleum portions not distilled during refining and may also contain some distillate portions as well as otherwise waste materials from refining processes. High viscosity residual fuels may also contain portions which are solid particle, such as soot or pulverized coal or pulverized chars, and these portions may not liquify upon warming, as well as other portions which are immiscible liquids, such as water or aqueous solutions, and these latter portions may not burn in air. Char in oil slurries and water in oil emulsions as well as char, oil, water slurry emulsions can thus also be high viscosity residual fuels as defined herein. Some types of crude petroleum are already high viscosity residual fuels as naturally occurring. High viscosity residual fuels can also be derived from sources other than crude petroleum such as shale oils, tar sands oils, products of coal liquifaction, tars, chars, and liquids derived from coal or wood or vegetable gasification processes, etc. The term liquid fuel is used herein and in the claims to include wholly liquid fuels, slurries of suspended solids in liquids, mixtures of insoluble liquids, and mixtures of gas bubbles in liquids.

References cited during examination of the original application are:
1. U.S. Pat. No. 3,777,718, Pattas
2. U.S. Pat. No. 3,923,011, Pfefferle
3. U.S. Pat. No. 4,011,839, Pfefferle
4. Swiss Pat. No. 282,830, Shell Oil Co.
5. U.S. Pat. No. 4,333,423, Firey
6. U.S. Pat. No. 2,632,296, Houdry
7. U.S. Pat. No. 2,624,172, Houdry

SUMMARY OF THE INVENTION

The machines of this invention are combinations of internal combustion engine mechanisms to which a porous burner system is added. The existing prior art combustion system of the internal combustion engine may be retained, if desired. Preferably, however, the existing prior art combustion system of the internal combustion engine is removed. In either case a porous burner system is installed in the engine combustion space. A porous burner system of this invention comprises: a porous burner volume located within the combustion chamber of the engine; a means for pouring fuel upon an external area of the porous burner volume; a means for controlling the quantity of fuel poured upon an external area of the porous burner volume. Additional elements may also be used, if desired, in combination with the above elements, such as: means for controlling air flow into the engine to control torque; means for proportioning the fuel flow and the air flow; means for sensing the accumulation of solid carbon within the pores of the porous burner volume and adjusting the proportions of air to fuel so as to remove accumulated solid carbon; means for supplying steam into the pores of the porous burner volume; means for supplying special easy starting fuels during engine cold starting and warmup; means for stopping the engine.

In operation the fuel pouring means pours a quantity of fuel on to a portion of the external area of the porous burner volume at some time during the intake and compression process, and preferably early during compression. During compression this fuel quantity is forced by rising gas pressures into the pore spaces of the porous burner volume and is there spread out over the large internal pore surface area as is needed to achieve rapid fuel burning. Those portions of the fuel which evaporate into the air compressed into the pores will undergo compression ignition, in a manner similar to that in conventional diesel engines, at or near engine piston top dead center on the compression process. This compression ignition will burn evaporable fuel portions but only incompletely due to an excess of fuel over air within some portions of the pore spaces. Appreciable fuel portions may be carbonized to a solid carbon material on the interior pore surfaces. Additional air is needed, not only to complete the burning of gaseous products of incomplete fuel burning but also to burn any solid carbon deposited inside the pores, and this additional air is supplied in two ways. A portion of the engine air quantity is kept outside of the reactive pore spaces of the porous burner volume and is thus available to complete the burning of the gaseous products of incomplete fuel burning when these emerge from the pore spaces during the engine expansion process. The fuel is poured onto different parts of the external area of the porous burner volume with each succeeding engine cycle when carbonizing fuels are used and in this way a particular internal pore space will not again receive more liquid fuel poured on until several engine cycles have intervened. During these several intervening engine cycles, the air quantity compressed into these pore spaces is utilized to oxidize the solid carbon materials left behind therein from the fuel previously poured on. The solid carbon thusly oxidized within the pore spaces will be only incompletely burned, largely to carbon monoxide and hydrogen if steam is present, due to the strongly reducing conditions prevailing inside carbonized pores. These gaseous products of incomplete oxidation of solid carbon in the pores will emerge from the pore spaces during the engine expansion process and will then be fully burned by portions of that air quantity retained outside the pores.

In this way very high viscosity residual fuels can be efficiently burned in compression ignition engines of small diameter or of any diameter and this is one of the beneficial objects made available by this invention. Additionally, the porous burner systems of this invention are mechanically simple and of low cost since only low fuel pouring pressures are needed.

The internal combustion engines of this invention are also capable of efficiently burning slurries of wholly liquid fuels with particles of coal or other solid char fuels suspended therein. The solid char particles add to the solid carbon formed upon the interior pore spaces of the porous burner volume and are burned therein in the manner described above for solid carbon. These suspended solid char particles are preferably of low ash content and with most of the particles smaller than the pore size in order to minimize pore plugging. Prior art internal combustion engines cannot efficiently burn the solid char particles within such slurries since only a single engine cycle is available to complete their burning. Several engine cycles are made available for the burning of these solid char particles with the engines of my invention and their efficient burning thus results and this is another beneficial object made available by my invention.

Emulsions of air in liquid fuels or in slurries of liquid fuel and char particles can also be efficiently burned in the engines of my invention. Such emulsions will possess reduced flow resistance within the fuel control and pouring means and also within the pores of the porous burner volume. Such emulsions may also become more readily compression ignitable due to the longer air contact with fuel.

Reduced temperatures of the porous burner volume material and improved engine efficiency can be achieved by making steam available inside the pores of the porous burner volume during combustion as is described in the cross-referenced related applications. The resulting oxidation of solid carbon by steam is endothermic and thus reduces pore gas temperatures and hence porous burner volume material temperatures. The hydrogen produced by such steam oxidation of solid carbon is later burned during expansion when the pore gases emerge from the pores and react with the air portions retained outside the pores. In this latter way, the distribution of combustion energy release as between before piston top dead center and after piston top dead center can be adjusted to achieve the maximum efficiency distribution. However, that pore steam quantity yielding best engine efficiency may not be the same as that pore steam quantity which yields acceptable running temperatures for the material of the porous burner volume. In general, as pore steam quantity is increased relative to pore oxygen quantity, the material temperatures are reduced and a larger portion of combustion energy release occurs after piston top dead center. But steam can be used in this way only below that steam to oxygen ratio where the pore reactions have no net heat of reaction since the resulting chilling of the porous burner volume will arrest the needed burning of the solid carbon deposits.

BRIEF DESCRIPTION OF THE DRAWINGS

Portions of a porous burner system are shown in FIG. 1 together with some portions of an internal combustion engine mechanism, 2, such as the piston, 3, connectong rod, 4, and cylinder wall, 5, as cooperate directly with the porous burner system. The porous burner system shown in FIG. 1 comprises a porous burner volume, 1, a means, 6, for pouring fuel upon an external area, 7, of said porous burner volume, while the engine piston, 3, is rising during the engine compression process, and a means, 9, for controlling the quantity of fuel so poured.

Some details of an example fuel pouring means, 6, are shown in FIG. 2 and comprise pouring nozzles, 19, on an extensible spigot, 13, extended and retracted by a drive member, 17, and supplied with fuel via various channels and passages, 15, 16, 21, 18.

Figure 3:
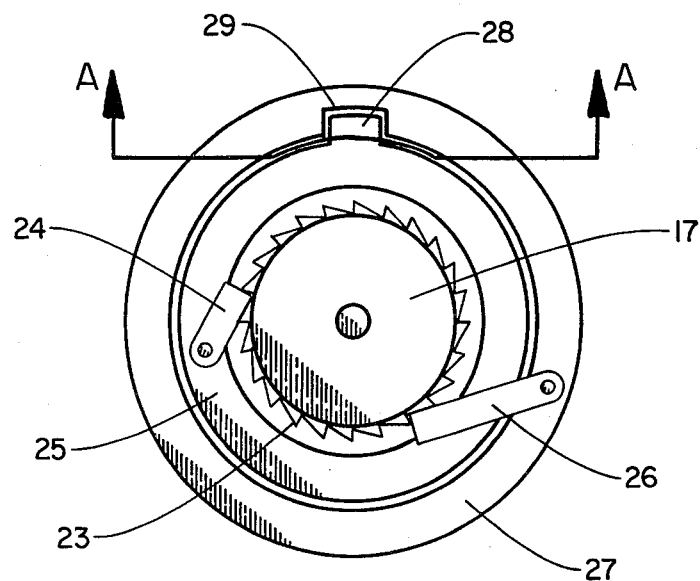
Figure 4:
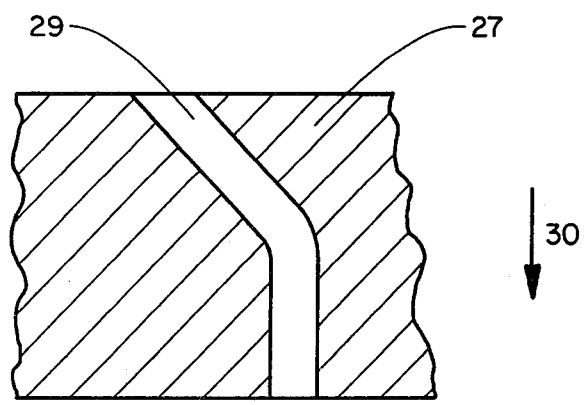

An example of a mechanism for intermittent rotation of the pouring nozzles, 19, via the drive member, 17, is shown in FIGS. 3 and 4 and comprises a rotator collar, 25, rotated via pins, 28, and slots, 29, in the fixed collar, 27, said rotator collar, 25, acting via a ratchet pawl, 24, to intermittently rotate the drive member, 17.

Figure 5:
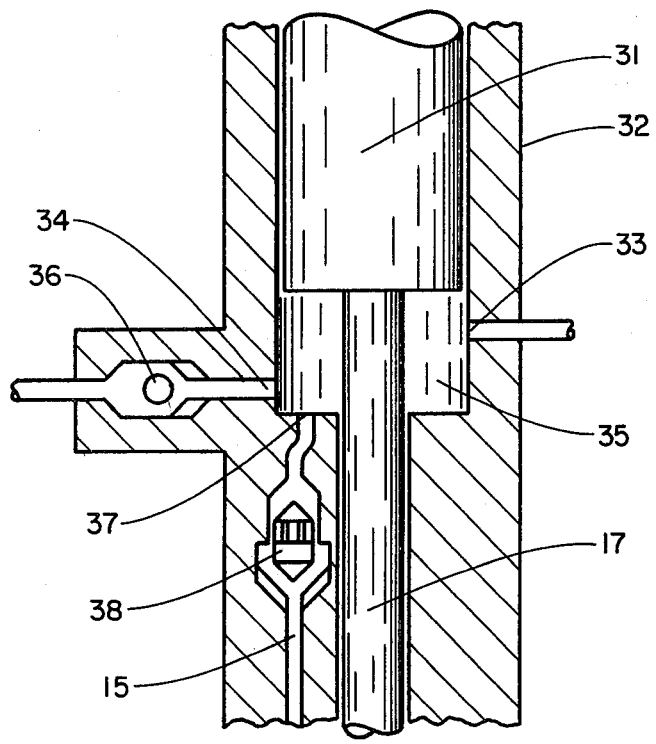

An example of a means, 9, for controlling the quantity of fuel poured upon an external area of the porous burner volume, 1, is shown partially in FIG. 5 and comprises a variable stroke pump plunger, 31, and pump cylinder, 32, with spill ports, 33, supply ports, 34, and delivery ports, 37.

Figure 2:
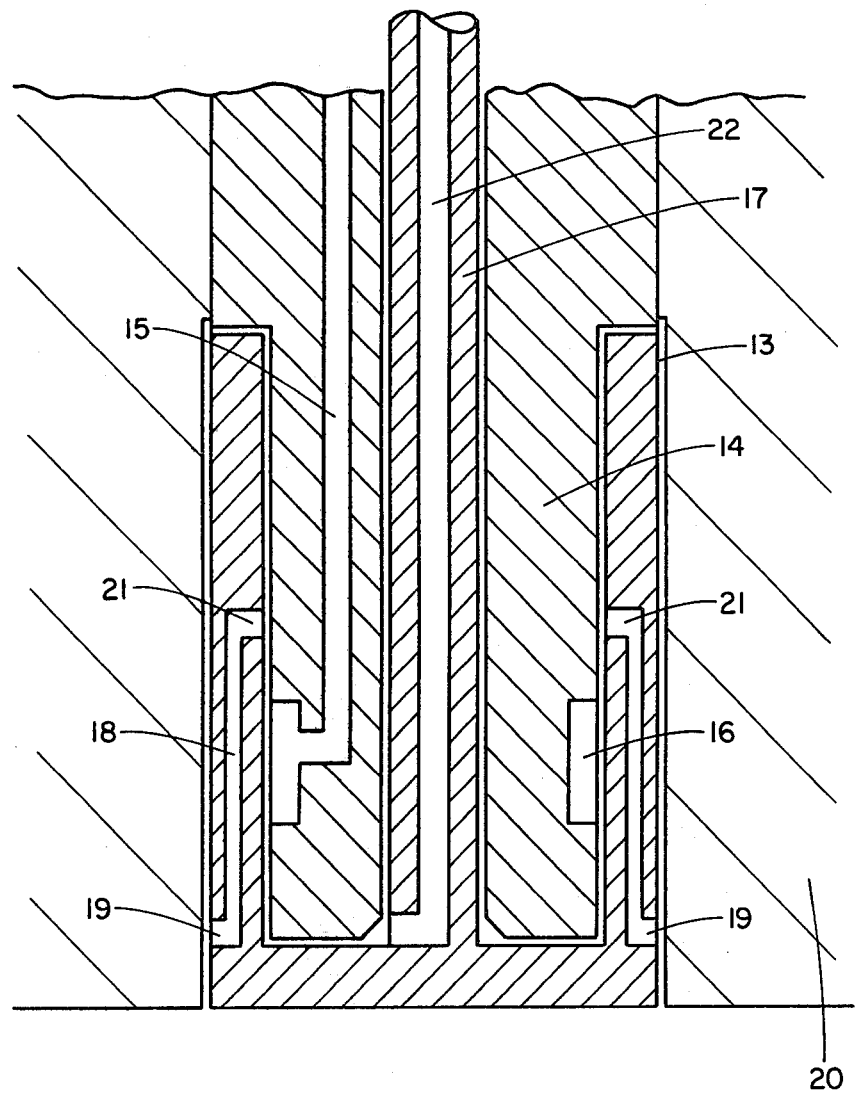
Figure 6:
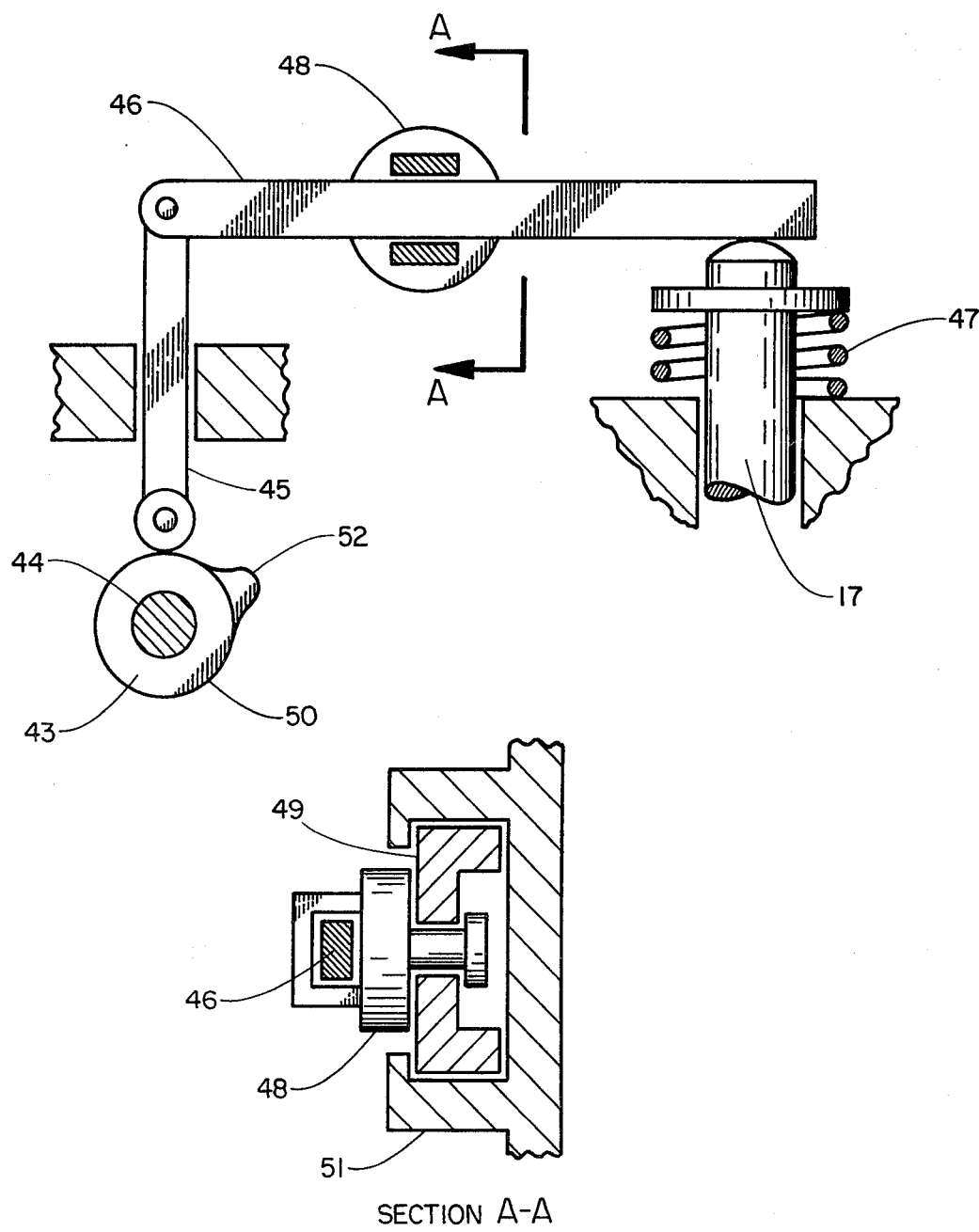
Figure 9:
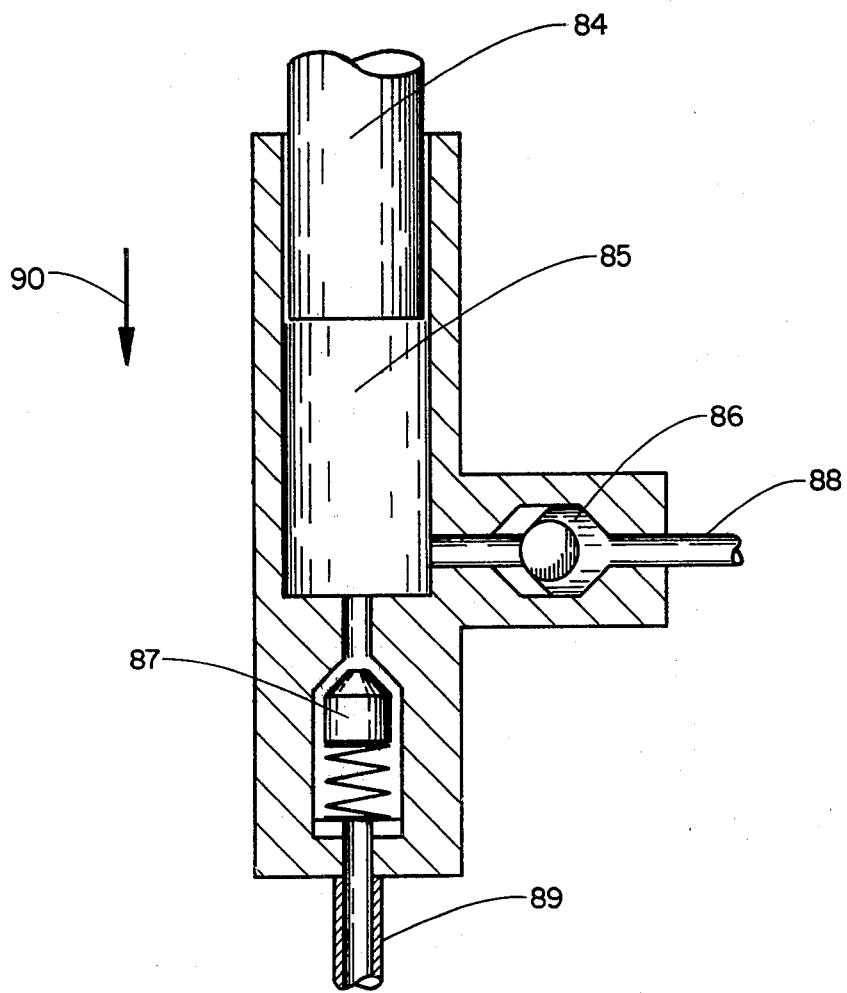

An example of an adjustable stroke drive means is shown in FIG. 6 suitable for driving the variable stroke pump plunger, 31, of FIG. 5 or for actuating the drive member, 17, of FIG. 2, or for actuating the piston, 84, of FIG. 9.

Figure 7:
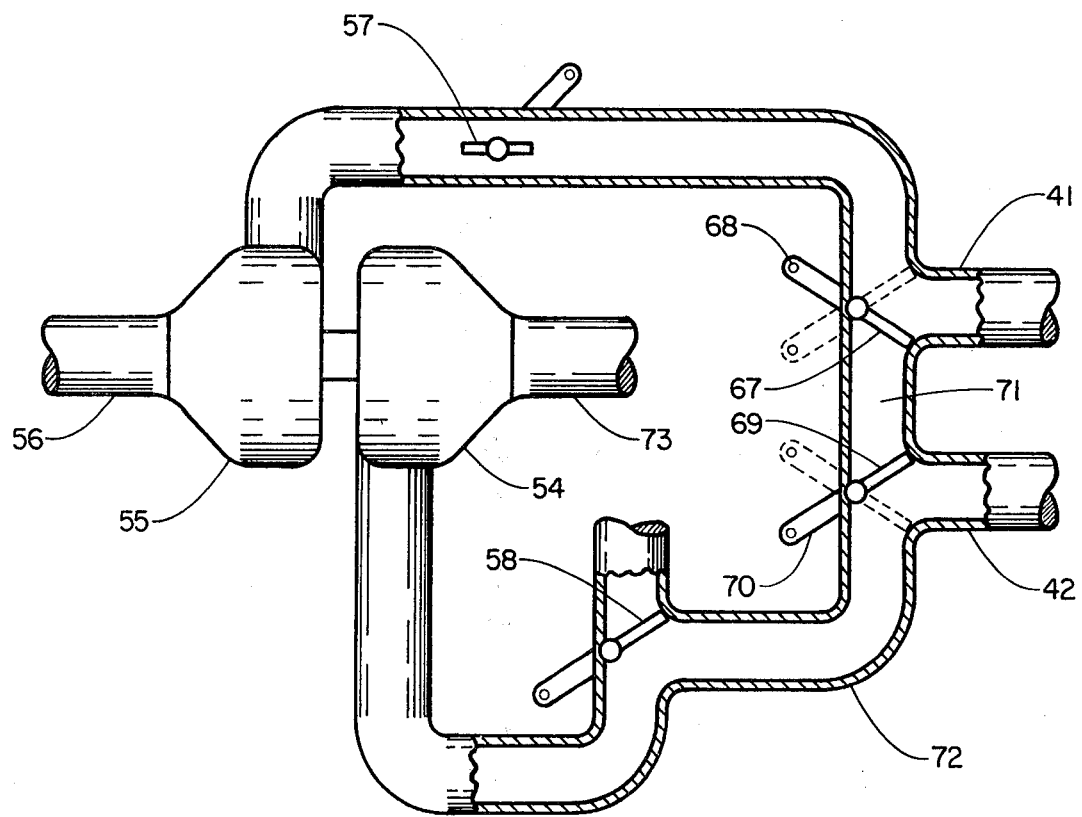

A turbocharger scheme for control of engine intake air density and hence engine air flow quantity is shown schematically in FIG. 7.

Figure 8:
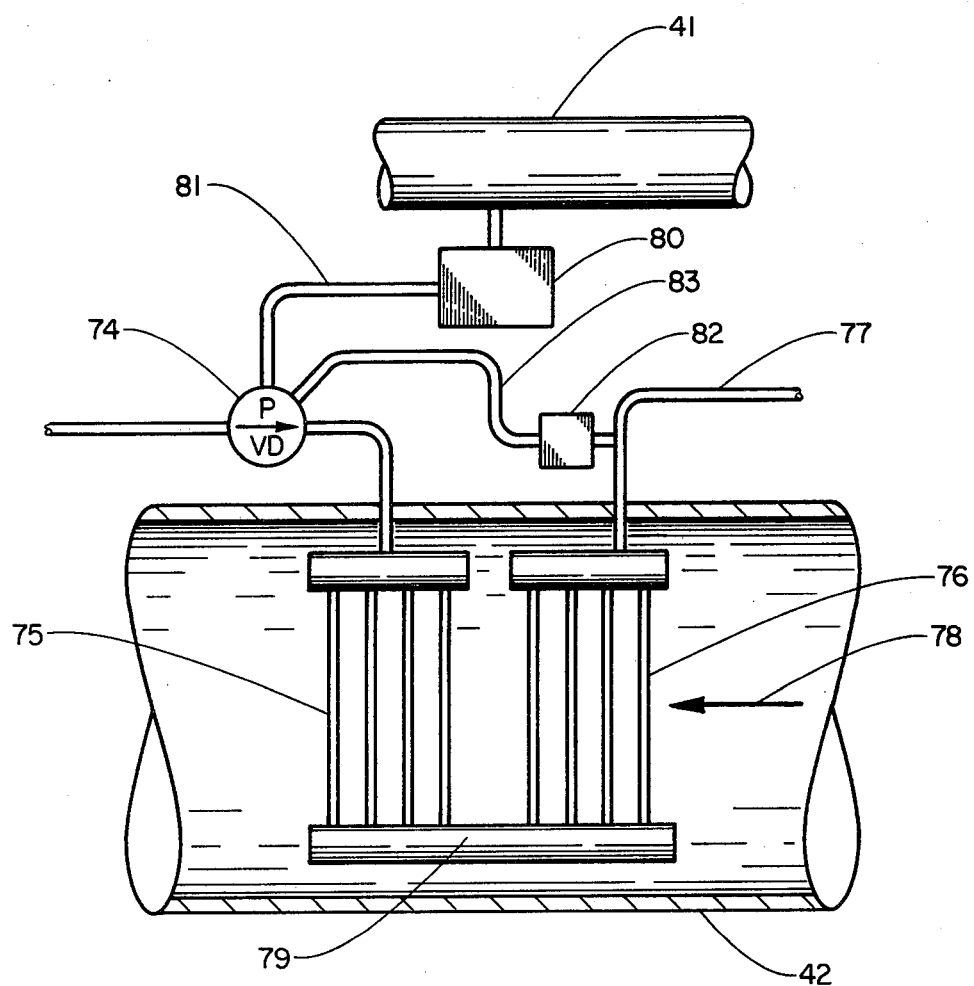

An engine exhaust gas fired steam boiler is shown schematically in FIG. 8.

An example of a volume controlled steam delivery means is shown in FIG. 9 suitable for delivering steam into the engine cylinder.

DESCRIPTION OF THE PREFERRED EMBODIMENTS

Various details of the several elements of this invention will now be described together with a description of how these elements function in combination with each other and with the basic internal combustion engine mechanism portion of the combination.

Figure 1:
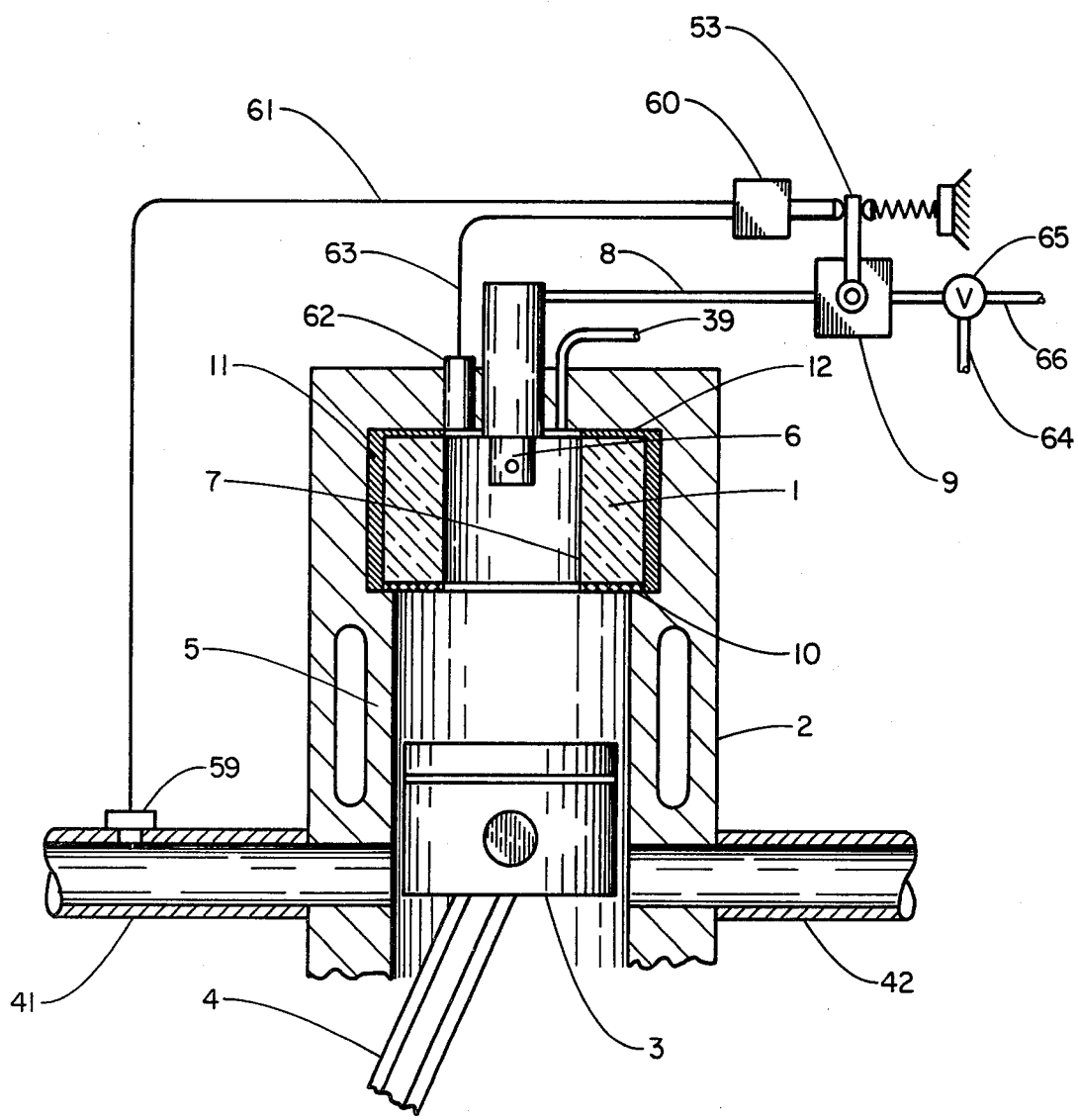

An example of a porous burner system is shown in FIG. 1 with a porous burner volume, 1, located in the combustion chamber of an internal combustion engine, 2. Only the piston, 3, connecting rod, 4, cylinder wall, 5, intake pipe, 41, and exhaust pipe, 42, of the internal combustion engine portion are shown in FIG. 1 in order to avoid undue complexity of the drawing. A fuel pour valve, 6, is shown in position to pour liquid fuel upon portions of the external surface, 7, of the porous burner volume, 1, while the engine piston, 3, is rising during the compression process. Fuel is supplied to the fuel pour valve, 6, via the connection, 8, and the quantity of fuel thusly poured during an engine cycle is controlled by the fuel flow control means, 9, such as an adjustable displacement pump. A single porous burner system per engine cylinder is shown in FIG. 1, and this is the minimum, but for engines of larger piston diameter more than one porous burner system can be used in each engine cylinder.

The porous burner volume, 1, is made of a porous solid high temperature material, such as a ceramic, and this term is used herein and in the claims to mean a material satisfying at least the following requirements:

a. The material remains a solid at the maximum temperatures encountered in the engine.
b. The material possesses open cell pores which allow inflow of gases and liquids in a direction essentially normal to those external surfaces upon which the fuel is poured.

The need for the temperature capability is clear. The open cell porosity is needed so that the fuel poured on can penetrate deeply inside the volume and thus become spread out over a large area. The preferred directionality of the open cell porosity can produce a deeper penetration of the fuel and an increased area of spreading. A single piece porous burner volume, 1, is shown in FIG. 1, but a segmented volume can also be used and such segmentation can be useful to reduce thermal expansion stresses within the porous burner volume. The non poured upon portions of the external surface area of the porous burner volume, as at 10, are preferably of low porosity or sealed by glazing or other means, so as to direct the flow of air during compression largely into those active pore spaces receiving fuel and containing solid carbon. Other non poured upon portions of the external surface area of the porous burner volume which are close to or in contact with the cylinder walls, as at 11 and 12, can also be of low porosity or sealed and hence impenetrable to gas flow during compression, and additionally can be insulated, as for example by use of a layer of closed cell ceramic, so that fuel portions do not reach the cold engine cylinder wall, since such fuel chilling would retard proper burning.

It is important that the gases flow into the pore spaces of the porous burner volume and not flow through these pore spaces. Were throughflow to take place, some portions of the poured on liquid fuel could be carried on through and not undergo the spreading out over the large internal pore area needed for complete and efficient combustion. The undesirable throughflow can be avoided by arranging that all those external surface areas of the porous burner volume upon which liquid fuel is poured be in contact with a single, undivided portion of the combustion chamber space, and that the remaining external surface areas of the porous burner volume be largely sealed to prevent gas flow through them.

As engine speed is increased, the excess pressure required to force air into the pore spaces during compression as well as the pressure drop required to force the combustion products out of the pore spaces during expansion necessarily increase due to flow friction. Hence, engine work output and efficiency are reduced. The efficiency loss due to this pore flow friction can be reduced in various ways as, for example, the following:

a. Use relatively low engine speeds;
b. Use larger diameter pores;
c. Increase available external flow area of the porous burner volume, as by increase of piston diameter relative to piston stroke;
d. Insure that no throughflow occurs in the pore spaces, but only inflow during compression and outflow during expansion.

Most high-viscosity residual fuels contain some ash-forming ingredients and the resultant ash will tend to gradually fill the interior pore spaces of the porous burner volume. Eventually, the porous burner volume will need to be replaced or the accumulated ash materials removed therefrom. The engine running time between porous burner replacement or cleanup shortens when higher ash content fuels are used and when fuel flow rate per unit of piston displacement is high as for high speed engines or for highly supercharged engines. These undesirable effects of fuel ash content can be mitigated by use of ash volatilization additives in the fuel and by use of higher temperatures of the burner volume. The chlorides and bromides of many ash forming metals are more volatile than their oxides or sulfates. Hence, deliberate addition of chlorine or bromine containing additives to the fuel could produce ash components of high volatility which would be removed from the pore spaces during expansion and would leave the engine during exhaust. Preferably these ash volatilization additives would be themselves of very low volatility so as to be preferentially deposited into the solid carbon fuel portions deposited inside the pore spaces where ash removal is to take place. Such ash evaporation could also be promoted by increasing the temperature of the porous burner volume, as by using minimum values of the steam-oxygen ratio, ap. For these ash removing purposes, the materials of the porous burner volume are preferably selected to be resistant to chemical attack by chlorine or bromine and to be useable at higher temperatures.

The gross volume, VG, of the porous burner volume, 1, depends upon the pore volume fraction, PG, thereof, the engine compression ratio, CR, the engine displacement volume per cylinder, VD, and the fraction, X, of the engine clearance volume, VCL, which is pore volume. By the accepted definitions of these terms it follows that:

$$VG = \frac{(X)(VD)}{(PC)(CR-1)}$$

The fraction, X, clearly cannot exceed unity and additionally must exceed zone sufficiently to provide that minimum pore volume needed to efficiently burn all fuel placed therein at maximum fuel flow rate per engine cycle and hence also at maximum intended engine torque. This latter minimum value of the fraction, X, is best determined experimentally at maximum intended fuel flow rate per engine cycle with X being varied until that value of X if found yielding best engine efficiency. When the fraction X is too large and approaching unity engine efficiency will be reduced by the unnecessary throttling flow into and out of the pore spaces of the air intended for the final burning of those gaseous products of incomplete fuel burning which emerge during expansion from those pore spaces containing fuel portions. When the fraction, X, is too small, engine efficiency will be reduced at maximum fuel flow rate by incomplete fuel burning. An approximate analysis of the pore volume occupied by the gaseous products of incomplete burning produced within the reactive pore spaces from the maximum fuel quantity yields the following table of estimated minimum values for the fraction, X, in terms of the mol ratio of steam to oxygen, ap, of those gases forced inside the pore volume during compression:

| Pore ratio; $\frac{\text{steam mols}}{\text{oxygen mols}}$; ap | Minimum Pore Volume Fraction of Clearance; Min. X |
|---|---|
| 0 | .86 |
| 0.2 | .73 |
| 0.4 | .62 |
| 0.6 | .53 |
| 0.8 | .45 |
| 1.0 | .38 |
| 1.2 | .32 |
| 1.5 | .24 |

For these approximate calculations, the following assumptions apply: engine volumetric efficiency is nearly 100 percent and overall there is 20 percent excess air at maximum fuel flow; the fuel contains between about 7 and 8 percent hydrogen; the reacted gas temperature gradient within the pore volume is not appreciably affected by heat transfer effects. Other assumptions will yield somewhat different values for the minimum value of the fraction X, than those shown in the foregoing table.

The mol ratio of steam to oxygen, ap, of the gases forced inside the pore volume during compression influences the minimum value of the fraction, X, by virtue of the large effect of steam upon resulting pore gas temperature and the effect of steam upon the air quantity needed to fully burn the gaseous products of incomplete burning when these emerge from the reactive pore spaces during the engine expansion process.

One particular example of a means for pouring fuel on to a portion of the external area of the porous burner volume is shown in part in FIG. 2, corresponding to the fuel pour valve, 6, of FIG. 1. This example fuel pour valve comprises a spigot, 13, which can be extended and retracted as well as rotated by the spigot drive member, 17, pour passages, 18, and pour nozzles, 19, within the spigot, 13, a fixed fuel channel member, 14, containing supply channels, 15, supplying fuel to the distribution channel, 16. The vent passage, 22, connects to the space between the extensible spigots, 13, and the fixed channel member, 14, to facilitate spigot actuation. As shown in FIG. 2 the spigot, 13, is retracted into the head of the engine cylinder wall, 20, within which the fixed channel member, 14, is mounted, and no fuel pouring is occurring since the ports, 21, are not indexed with and hence are sealed off from the distribution channel, 16. When the spigot, 13, is extended by the drive member, 17, sufficiently that the pour nozzles, 19, are clear of the cylinder wall head, 20, and directed toward an external area of the porous burner volume, 1, the ports, 21, index the distribution channel, 16, and fuel pours out via the supply channel, 15, the distribution channel, 16, the ports, 21, the pour passages, 18, and the pour nozzles, 19, on to the porous burner volume area. Continued extension of the spigot, 13, can be used to distribute the poured fuel over a larger portion of the external area of the porous burner volume. Such fuel pouring will continue until the spigot, 13, is retracted by the drive member, 17, sufficiently that the ports, 21, no longer index with the distribution channel, 16, after which pouring ceases. The duration of pouring as well as the area poured upon can thus be controlled by control of the extension and retraction motions of the drive member, 17. Additionally, the poured upon area can be changed, as between engine cycles, by rotation of the drive member, 17. Further additionally the timing of fuel pouring can be controlled by control of the motion of the drive member, 17, relative to the engine piston, 3. By methods already well known in the art of mechanisms, almost any finite motion pattern and timing of extension, retraction and rotation can be imparted to the drive member, 17, and hence a wide choice of fuel pour durations, timings and areas poured upon is available.

One example of a variable stroke length drive means suitable for driving the drive member, 17, of the FIG. 2 form of pouring means is shown in FIG. 6 and comprises a cam, 43, driven by the engine camshaft, 44, a cam follower, 45, driving the link, 46, which drives the drive member, 17, with return motions caused by return spring, 47. The link, 46, is pivoted about the center of the circle piece, 48, and this center is mounted to the bar, 49, which is adjustable along the direction of the link, 46, when the cam follower, 45, is on the base circle, 50, of the cam, 43. The bar, 49, is held in the fixed guideways, 51, which allow motion of the bar, 49, and hence of the circle piece center only in the desired direction. The stroke of the drive member, 17, can then be adjusted by adjusting the position of the bar, 49, and circle piece, 48, along the indicated direction of the link, 46, with drive member stroke increasing as the circle piece, 48, is adjusted closer to the cam follower, 45, and vice versa. This adjustment of the bar, 49, and circle piece, 48, can be made, for example, in proportion to engine intake air density by action of an intake air density sensor and control such as is shown in FIG. 1. The raised section, 52, of the cam, 43, is positioned relative to engine piston motion so that fuel pouring occurs only during engine compression or intake processes.

We prefer to pour the fuel on to an external area of the porous burner volume at that time during the engine intake and compression process which will cause this fuel to achieve optimum penetration when forced into the pore spaces by the compression process. Clearly pouring is to commence only after the engine intake process has started so that fuel will not be wasted unburned into the exhaust gas. Pouring also is to cease prior to the end of the engine compression process to avoid the incomplete burning resulting from the fact that fuel poured on after compression has ceased may not be forced into the pore spaces and thus will not be spread out over the large surface area needed for efficient burning. Early fuel pouring, as during the latter part of the intake process, will place the fuel deeply into the pore spaces. Late pouring, as during the latter part of the compression process, will place fuel shallowly into the pore spaces. With optimum fuel penetration, the penetrated fresh fuel and the copenetrated air, and steam if used, are present in approximately the same proportions in all pore spaces into which fresh fuel has penetrated. That fuel pouring timing which produces optimum fuel penetration is thus seen to depend upon the relative flow characteristics of the fresh fuel and the air and steam within the pore spaces as well as upon the flow resistance characteristics of the pore passages within the porous burner volume and these will vary with the kind of fuel being used and with the kind of porous high temperature material being used for the porous burner volume. Hence optimum fuel pouring timing is best determined experimentally by varying the duration, rate, starting and stopping of fuel pouring to find that combination yielding best engine efficiency.

The pressure of the fuel being poured need only be slightly above the prevailing gas pressures within the engine cylinder and the high atomizing injection pressures needed for prior art diesel engines are not required and this is another beneficial object made available by this invention. Preferably, a small air gap is left between the pour nozzles, 19, and the poured upon areas of the porous burner volume, 1, so that air flow into the pore spaces is not retarded during pouring. But this air gap can be small in order to prevent any atomization of the liquid fuel being poured. In the example fuel pouring means of FIG. 2 only two pour nozzles, 19, are shown but any number of these can be used and further the distribution channel, 16, and ports, 21, can be so arranged, if desired, that the number of pour nozzles, 19, actually pouring fuel can change as the spigot, 13, extends and retracts.

As engine torque is increased more fuel is poured upon external areas of the porous burner volume, and either more fuel can be poured onto essentially the same amount of area or the larger fuel quantity can be poured onto a larger area or a combination of these methods can be used. Where the air quantity per engine cycle is not changed with changing torque, as, for example, using atmospheric aspiration, it will usually be preferable to change the size of the poured upon area in approximate proportion to the quantity of fuel poured on so that the local ratio of fuel quantity to air quantity available within the pore spaces remains approximately constant. Where the air quantity per engine cycle is proportional to the fresh fuel quantity per engine cycle, as for example using some types of supercharging, it will usually be preferable to pour the fuel over essentially the same size of poured upon area and again in order to keep an approximately constant local ratio of fuel to air within the pore spaces. When turbocharging is used the ratio of air quantity to fuel quantity per engine cycle may well vary appreciably with varying torque and in this case we may want to vary not only the fuel quantity poured on a given area but also the total area over which the fuel is poured. For the example fuel pouring means shown in FIG. 2 the area poured upon can be varied either by a variation of the arc of rotation of the spigot, 13, or preferably, as more easily, by a variation of the length of extension of the spigot, 13, during fuel pouring. For example, as engine torque increased the drive member, 17, could extend the spigot, 13, further and thus increase the external area of the porous burner volume poured upon and an example method for thusly varying the extension has already been described hereinabove.

For the example fuel pouring means of FIG. 2, the amount of fuel poured upon a unit external area of the porous burner volume can be most easily varied by varying the pressure of the fuel within the distribution channel, 16, by the fuel quantity controller, 9. Other methods of varying the fuel pour rate per unit external area can also be used such as variable displacement pumps. In these and other ways the example fuel pouring means of FIG. 2 can be used so as to independently vary the extent of area poured upon and the fuel quantity poured upon unit area in any desired combination.

When those fuels are being used which form a solid carbon deposit within the pore spaces during their combustion, the external area portion of the porous burner volume upon which fuel pouring takes place is preferably changed from one engine cycle to the next. By thus changing the poured upon area between cycles, the solid carbon deposit is provided with at least one and preferably several succeeding engine cycles within which to burn itself completely. During these succeeding engine cycles the air and steam forced into these solid carbon deposited pore spaces is devoted only to the burning of these carbon deposits since no fresh fuel is being poured upon and forced into these pore spaces. The pattern of changing the poured upon area between engine cycles can be any of several possibilities. For example, the poured upon area can shift to the next adjacent area in a given direction on the next engine cycle and this same direction, adjacent area shift pattern can continue for one or more cycles until either another fuel pour nozzle or the same fuel pour nozzle overtakes the original poured upon area. This same direction, adjacent area, shift pattern might be preferred where the available pore space has been minimized and that air intended for the final buring during expansion is largely kept outside the pore spaces. As another example, the poured upon area can be shifted beyond a skipped over area for the next engine cycle in a given direction and this same direction, skipped area, shift pattern can continue for one or more engine cycles until some fuel pour nozzle overtakes either the original poured upon area of preferably overtakes the originally skipped over area. These same direction, skipped area, shift patterns might be preferred where the available pore space exceeds the minimum so that a portion of that air intended for the final burning during expansion is also forced inside same of the pore spaces such as those pore spaces reached via the skipped over areas. That final burn air compressed into the pore spaces of the skipped over areas will emerge therefrom during expansion and be then in close proximity to the gaseous products of incomplete fuel burning emerging at the same time from those adjacent areas upon which fuel has been poured during that and preceding engine cycles, and this close proximity will yield rapid final burning of these emerging fuel components. For the example fuel pouring means shown in FIG. 2, the area poured upon can be changed from one engine cycle to the next either by a cycle-to-cycle change of the length of extension of the spigot, 13, or more preferably by rotating the spigot, 13, through a displacement arc with each engine cycle. Where the poured upon area is thusly changed from one engine cycle to the next by rotating the spigot, 13, the shift pattern can be set by setting the length of arc through which the spigot is rotated for each engine cycle. For the adjacent area shift pattern the spigot, 13, would be rotated only enough to aim the pour nozzles, 19, at the area next adjacent to that poured upon in the preceding cycle and this same direction of rotation is preferably continued for succeeding engine cycles. A skipped area shift pattern can be achieved by increasing the arc of displacement of the spigot, 13, sufficiently that the pour nozzles, 19, are aimed at the area at least one skipped area beyond that poured upon in the preceding cycle and this same direction of rotation is preferably continued for succeeding engine cycles. The desired shift pattern is then created by actuating the spigot, 13, via the drive member, 17, and mechanisms for carrying out such actuations are already well known. Other cycle-to-cycle area shift patterns and other methods of creating the chosen shift pattern may also be used if desired and the above descriptions serve only as examples.

One particular example of a rotator mechanism for creating a cycle-to-cycle shift pattern of the poured upon area is shown in FIG. 3. The spigot drive member, 17, is fitted with ratchet teeth, 23, acted unidirectionally upon by rotator ratchet pawl, 24, pivoted to the rotator collar, 25, and also by hold ratchet pawl, 26, pivoted to the fixed collar, 27. One or more guide pins, 28, are secured to the rotator collar, 25, and fit closely into guide slots, 29, recessed into the fixed collar, 27, so that as the rotating collar and the fixed collar slide past one another in the direction of their common centerline of symmetry, the guide pin, 28, can rotate the rotating collar, 25, relative to the fixed collar, 27, in a manner controlled by the geometry of the guide slot, 29. One example geometry for the guide slot, 29, is shown in FIG. 4, which is the sectional view A—A from FIG. 3, and this example guide slot will cause rotating collar, 25, to first rotate and then remain non-rotational relative to the fixed collar, 27, as the rotating collar, 25, is moved in the direction, 30. The rotating collar is additionally so secured to the spigot drive member, 17, as to follow drive member motions of extension and retraction along their common centerline of symmetry. In operation as the drive member, 17, extends in the direction, 30, for fuel pouring the rotating member, 25, is first rotated and then held by the above action of the guide pin, 28, in the guide slot, 29, and the drive member, 17, as well as the spigot, 13, are also similarly actuated by the action of the rotator ratchet pawl, 24, upon the ratchet teeth, 23. As the drive member, 17, retracts the rotating member, 25, reverses the above described motions but the spigot drive member, 17, does not, being restrained from reverse rotation by the hold ratchet pawl, 26. In this way the spigot, 13, is unidirectionally rotated through a displacement arc to shift the poured upon area each time the drive member, 17, is extended for pouring and hence for each engine cycle. So long as the position of the fixed collar, 27, is unchanged relative to the stroke of extension and retraction of the drive member, 17, the shift pattern of the poured upon area is fixed as set by the geometry of the guide slot, 29. However, by adjusting the position of the fixed collar, 27, relative to the drive member stroke the shift pattern can be changed as to the length of arc of shift per cycle, with a guide slot of the type shown in FIG. 4. As the fixed collar, 27, is adjusted opposite to the direction of extension of the drive member, 17, the arc of shift per cycle is shortened since the guide pin, 28, starts out in the guide slot, 29, nearer to the straight, non-rotating portion thereof. An opposite adjustment of the fixed collar increases the arc of shift per cycle. Thus, the rotator mechanism shown in FIGS. 3 and 4 can be used to achieve either a single fixed shift pattern or, by adjustment of the fixed collar, 27, to achieve different shift patterns for different engine operating conditions. Engines operated at essentially constant load and speed can usually utilize a particular, fixed shift pattern. Engines operated over a wide range of load and speed, as for trucks and buses, may prefer to utilize an adjacent area shift pattern at high torque and a skipped over area shift pattern at low and medium torque. The rotator mechanism shown in FIGS. 3 and 4 is only one example of such a device and many other rotator mechanisms of the prior art can also be used for the purposes of my invention.

The foregoing description of particular means for pouring fuel upon an external area of the porous burner volume are only examples and it is not intended thereby to limit my invention to only these examples. Many other kinds of fuel pouring means can also be used. For example, a stationary pour nozzle is mechanically simple and inexpensive and could be suitable for use on engines using wholly distillate fuels which do not form a solid carbon deposit during combustion within the pore spaces. Also the foregoing examples described moveable pouring means for use with stationary porous burner volumes when the poured upon areas was to change, but it is possible to use instead a stationary pouring means and a moveable porous burner volume.

Many different kinds of means for controlling the quantity of fuel poured upon an external area of the porous burner volume can be utilized as are already well known in the art of fuel pumping and metering. Most such fuel quantity controls use flow rate control at a set duration, or duration control at a set flow rate, or a combination of these schemes.

An example of a duration control at set flow rates means for controlling fuel quantity is sketched in part in FIG. 5 and is especially well suited for use with the particular fuel pouring means shown in FIG. 2 when variable extension of the spigot, 13, is utilized with the extension being about proportional to fuel quantity poured. The pump plunger, 31, can be secured to and move with the spigot drive member, 17, and fits closely inside the pump cylinder, 32. A spill port, 33, connects to the fuel tank or the fuel supply pressure and a supply port, 34, connects to the fuel supplied at supply pressure in order to refill the pump chamber, 35, via the check valve, 36, which permits such refilling but prevents back flow via the supply port, 34. The delivery port, 37, delivers fuel via the displacer check valve, 38, to the supply channel, 15, and the distribution channel, 16, of the fuel pouring means such as is shown in FIG. 2. In operation as the plunger, 31, descends with the drive member, 17, while the spigot, 13, is being extended fuel thusly displaced from the chamber, 35, is returned via the spill port, 33, until this spill port is covered and thus sealed by the plunger, 31. The spill port, 33, is positioned relative to the stroke of the plunger, 31, that it is thusly covered and sealed concurrently with sufficient emergence of the pour nozzles, 19, as to direct fuel pouring therefrom on to an external area of the porous burner volume, 1. Thereafter, continued downward motion of the plunger, 31, forces fuel via the delivery port, 37, the displacer check valve, 38, the supply channel, 15, the distribution channel, 16, the ports, 21, the pour passages, 18, and the pour nozzles, 19, on to the porous burner volume area. Such fuel pouring continues until the descending motion of the plunger, 31, and the drive member, 17, and hence the spigot, 13, ceases. Hence the fuel quantity thusly poured varies directly with the fixed displacement piston cross sectional area of the plunger, 31, and the length of stroke of the plunger and this quantity can be controlled by controlling the length of stroke of the plunger, 31, as by the mechanism shown in FIG. 6. During retraction the plunger, 31, the drive member, 17, and the spigot, 13, move upward and no fuel pouring occurs but a sufficient volume of fuel is withdrawn from the pour nozzles, 19, and connecting passages by action of the displacer check valve, 38, as to prevent fuel dribbling from the pour nozzles. Also during retraction fresh fuel is delivered via the check valve, 36, and the supply port, 34, to refill the pump chamber, 35. Preferably, such retraction of the plunger, 31, drive member, 17, and spigot, 13, is completed before burning has commenced and particularly before afterburning has commenced so that the spigot is not appreciably exposed to high-temperature combustion products. Also preferably the pressure at which fresh fuel is supplied to the supply port, 34, is lower than the engine cylinder gas pressures during retraction so that fuel pouring on to the porous burner volume external area portions occurs only during pour nozzle extension. The displacer check valve, 38, can be similar to such check valves as are used for example in conventional diesel engine fuel injection apparatus to withdraw a small fuel volume from the fuel injection nozzle after injection is completed. The stroke length of the plunger, 31, and drive member, 17, can be varied by use of a variable stroke drive mechanism driven from the engine crankshaft or camshaft at the proper time in the engine cycle and this drive mechanism portion of the fuel quantity control means is not shown in FIG. 5 to avoid undue complexity of the drawing. For the example fuel pouring means of FIG. 2 and the example fuel quantity control means of FIG. 5 the drive mechanism portions of these two means can be a single mechanism, and this mechanism can be any of the variable stroke mechanical or hydraulic or electrical drive mechanisms as are already well known in the art.

Another particular example of a suitable means for controlling the fuel quantity is the fixed stroke, adjustable spill port type of fuel metering pump of the Bosch type as widely used in conventional diesel engines, and this could be the fuel controller, 9, of FIG. 1, with spill port and hence poured fuel quantity controlled via the lever, 53.

A common rail, adjustable fuel pressure system can be used as an example of a set duration, variable fuel flow rate type of means for controlling the fuel quantity. If used with the FIG. 2 type of pouring means the common rail would supply fuel at controlled and adjustable pressure to the supply channel, 15. The extension of the spigot, 13, would be made the same for each engine cycle when a set duration of pouring was preferred. Common rail fuel supply and adjustable pressure systems of this type are already well known in the art. A shortcoming of the simple common rail system is that fuel quantity will vary not only with fuel pressure as adjusted in the common rail but also with gas pressures in the engine cylinder during pouring. For an unthrottled, atmospherically aspirated engine, the cylinder gas pressure will be nearly the same from one engine cycle to the next. However, for throttled or supercharged engines a control scheme may be preferred which automatically increases common rail fuel supply pressure when cylinder gas pressures, or engine intake manifold pressure increases and vice versa.

As an example of a variable fuel flow rate and variable flow duration means for controlling the fuel quantity, the above-described adjustable fuel pressure common rail system can be used with the pouring means shown in FIG. 2 with the spigot extension, and hence the duration of flow and pouring, being also adjustable.

To control engine torque fuel quantity per engine cycle can be controlled, or air quantity per engine cycle can be controlled, or the fuel quantity and the air quantity per engine cycle can both be controlled. Control of fuel quantity per engine cycle can be done as described hereinabove and this is similar to the torque control means commonly used in conventional diesel engines. Control of air quantity per engine cycle can be done by control of throttling of the intake air or by control of supercharge of the intake air or by use of both controls as is already well known in the art. An example of an intake air quantity control scheme is shown in FIG. 7 wherein the engine exhaust gas driven gas turbine, 54, drives the intake air supercharger, 55, and intake air density can be controlled by controlling the portion of exhaust gas passing through the gas turbine, 54, by adjusting the exhaust bypass valve, 58. As less exhaust gas passes through the turbine, 54, both it and the supercharger, 55, do less work resulting in a reduced supercharge pressure and hence air density at the engine intake air pipe, 41. After all exhaust gas is bypassed away from the turbine, 54, by the bypass valve, 58, still further reductions of intake air pressure and hence density can be accomplished, if needed, by restricting intake air flow using the throttle valve, 57.

Control of torque via control of the fuel quantity per engine cycle may be satisfactory when volatile fuels are being used which form little or no solid carbon deposits within the pore spaces during combustion. In this case, each fuel quantity may be largely completely burned during that same engine cycle when it was poured upon the porous burner volume.

Control of torque via control of the air quantity per engine cycle may be satisfactory when highly involatile fuels are being used which are largely transformed into solid carbon deposits within the pore spaces during combustion. In this case, as for the cross-referenced char engines, more fuel materials may be available in the engine combustion chamber than air to burn them and torque can only be satisfactorily controlled via air quantity control. Nevertheless, some control of fuel quantity per engine cycle is necessary to avoid either fuel wastage if too much fuel is poured on or eventual loss of torque if too little fuel is poured on.

Preferably both fuel quantity and air quantity per engine cycle are controlled together by use of an air fuel proportioner and this scheme can be used with a wide variety of fuels differing in volatility and carbon deposit forming ability. In many types of engine service, such as for trucks and buses, the overall ratio of air per cycle to fuel per cycle is preferably fuel lean at reduced torque to secure full burnup of deposited carbon, and is preferably only slightly fuel lean at maximum torque to secure best utilization of available air quantity in the engine cycle. This preferred variation or any other selected variation can be achieved by use of suitable linkages between the engine torque control lever, the means for controlling the fuel quantity and the means for controlling the air quantity as already well known in the art. Such prior art mechanical linkages can produce essentially the same ratio of air quantity per cycle to fuel quantity per cycle whenever the same operating condition of the engine prevails, and this type of air fuel proportioner will be satisfactory in many uses of the engines of this invention. For example, torque control can be done via supercharge control, as shown for example in FIG. 7, and the fuel quantity can then be proportioned to air quantity, as for example via the intake air pressure sensor, 59, and controller, 60, of FIG. 1. The controller, 60, connected via the line, 61, to the sensor, 59, acts upon the fuel quantity control lever, 53, of the fuel quantity controller element, 9.

In some kinds of engine operation solid carbon deposits may accumulate within the pore spaces more rapidly than they are being removed by oxidation and pore space carbon plugging occurs. For example, an engine operated largely at maximum torque for long periods as in marine service and using a fuel very high in solid carbon deposit forming ability could experience this carbon accumulation problem. One remedy for this carbon accumulation problem is to install a carbon accumulation sensor, 62, in the engine combustion chamber of FIG. 1, which acts upon the air fuel proportioner, 60, via the connection, 63, to increase the proportion of air to fuel per engine cycle as carbon accumulates. Carbon plugging of pore spaces increases engine compression and peak pressures and thus a peak cylinder pressure sensor could function as a carbon accumulation sensor. Other carbon accumulation sensors can also be used such as an exhaust gas oxygen content sensor. Where such a carbon accumulation sensor and control device are used, the air fuel proportioner can set the air to fuel ratio equal to the sum of a set value and a correction value. The set value is the same at similar engine operating conditions as described hereinabove for the mechanical air fuel proportioner. The correction value is introduced by the carbon accumulation sensor and control to increase the air to fuel ratio when solid carbon accumulates and to return the air to fuel ratio to the set value when previously accumulated carbon has been removed by the more rapid burning at leaner air fuel ratios.

In other kinds of engine operation, such as for trucks and buses, carbon accumulation may occur at times of high torque running but the accumulated carbon will subsequently be removed at times of light torque running. Ordinarily, these engines used in this way will not need a carbon accumulation sensor and control device.

Where steam is also used as a pore space combustion reactant in order to limit porous burner volume temperatures and to increase the energy release proportion during expansion, a steam source is needed such as an external steam boiler, a separately fired steam boiler, or an engine exhaust gas fired steam boiler. Frequently, the engine exhaust gas fired steam boiler will be preferred as simpler and more economical of fuel. The engine exhaust gas possesses sufficient temperature and energy content to generate more steam than the engine can utilize. Where appreciable steam is needed for other non-engine related purposes, a separately fired steam boiler may be preferred and its fuel consumption to generate engine steam will usually be less than the engine fuel consumption at idling. The steam boiler pressure depends upon how the steam is admitted to the engine, low boiler pressures sufficing if steam is admitted during the engine intake process, and higher boiler pressures being needed if steam is admitted during the engine compression process.

Any of various kinds of steam boilers can be used as a means for supplying steam, such as, an external boiler, a separately fired boiler fired with engine or other fuel, an engine exhaust gas fired boiler. The engine exhaust gas fired boiler will often be preferred as more economical. One particular example of an engine exhaust gas fired boiler suitable for use as a steam supply means is shown in FIG. 8 and comprises, an adjustable flow feedwater pump, 74, an evaporator section, 75, a superheater section, 76, a steam delivery pipe, 77, with the evaporator, 75, and superheater, 76, located inside an engine exhaust pipe, 42, with the exhaust gas preferably flowing in the direction shown by the arrow, 78. In operation water is pumped by the feedwater pump, 74, into the evaporator, 75, where the water is evaporated into steam and this steam passes via the scale collector, 79, into the superheater, 76, where the steam is superheated before flowing via the delivery pipe, 77, to the steam delivery means. The particular example exhaust gas fired boiler shown in FIG. 8 can be a once-through boiler without appreciable steam or water storage so that the steam delivery rate at exit, 77, very quickly changes to equal feedwater pumping rate. An engine intake air flow quantity sensor, 80, connecting to the engine intake, 41, can function to adjust the feedwater pump flow quantity via the connection, 81, so that the mass ratio of steam delivered by the boiler to air taken into the engine can be controlled to a desired value.

When the engine is started cold, the exhaust fired boiler of FIG. 8 will be slow to heat up sufficiently to generate steam at boiler exit, 77, and liquid water could than be pumped into the engine cylinder with possible engine damage resulting. To avoid this result, a vapor sensor and control device, 82, can be placed in the boiler steam exit, 77, and act via the connection, 83, upon the feedwater pump, 74, to restrict boiler feedwater flow to very low rates until superheated steam is formed at boiler exit.

The steam can be admitted into the pore spaces in various ways such as, adding steam to the air quantity during engine intake, adding steam to the air quantity during the compression process, or preferably adding steam largely to only that air quantity forced inside the pore spaces during compression. Steam added to the entire air quantity during the intake process reduces engine volumetric efficiency. When the steam is added to the entire air quantity during compression better volumetric efficiency results but more steam is required leading to lower engine efficiency. The preferred method of adding steam requires the least steam quantity since most of it is placed inside the pore spaces where needed, but the steam admission method is more complex as is described in U.S. Pat. No. 4,333,423, entitled, "Engine Steam Stratifier," Briefly, this engine steam stratifier places the steam quantity largely into only that air quantity which is forced inside the pore spaces during compression. This stratification of steam can be achieved in several ways as, for example:

1. Admit steam during the intake process into only that air portion which subsequently reaches the pore spaces. This method acts to reduce engine volumetric efficiency.
2. Admit steam during the compression process into only that air portion which subsequently reaches the pore spaces. This method may need a change of steam admission timing with changes of engine operating condition.
3. Admit steam into that air portion which reaches the pore spaces at the same time that this air is entering the pore spaces. This method can utilize a nearly fixed steam admission timing but requires higher steam pressures. As an example of this latter method steam admission nozzles, 39, are placed in the engine combustion chamber as shown in FIG. 1 to direct the steam over those external areas of the porous burner volume, 1, where steam entry is desired and steam is admitted to these nozzles via a steam valve timed to open during the latter portions of the engine compression process when most of the pore air is being forced into the pore spaces. A somewhat more accurate steam admission can be secured by having the steam admission valve open area, or the steam admission pressures, proportioned to air flow rate into the pore spaces.
4. These and other methods of achieving the desired steam stratification are described further in the cross-referenced related application.

Any of several kinds of steam delivery means can be used to deliver the steam equally to each engine cylinder at that time in the engine cycle and at that position in the engine cylinder which will place the steam largely into that air mass which goes into those pore spaces of the engine combustion chamber containing solid carbon.

A portion of one particular example of a volume controlled delivery means is shown in FIG. 9 and comprises a piston, 84, operating inside a cylinder, 85, fitted with a suction check valve, 86, and a delivery check valve, 87. Steam is supplied via the connection, 88, to the suction valve, 86, and is delivered via the spring loaded delivery valve, 87, and the connection, 89, to the engine cylinder. At that time in the engine cycle when steam is to be delivered into the engine cylinder the piston, 84, is driven downward in the direction shown by the arrow, 90, thus closing the suction check valve, 86, opening the delivery check valve, 87, and delivering to that engine cylinder a quantity of steam proportional to the displacement volume of the piston, 84, in the cylinder, 85. Steam delivery stops when this downward motion of the piston, 84, stops, the spring force on the delivery valve, 87, being made sufficient to close this valve against the prevailing steam pressure. Following steam delivery the piston, 84, is withdrawn oppositely to the direction of the arrow, 90, thus opening the suction check valve, 86, and refilling the cylinder, 85, with steam from the steam supply means via the connection 88. The means for thusly driving the piston, 84, is not shown in FIG. 9 and can be any of the several piston drive means already known in the prior art such as cams and links driven from the engine crankshaft, or hydraulic pumps and valves driven from the engine crankshaft. The mass of steam thusly delivered into each engine cycle is proportional to the displacement volume of the piston, 84, in the cylinder, 85, and the density of the steam refilled into the cylinder, 85, from the steam supply means via the connection, 88. Where this steam displacement volume is fixed, the steam mass delivered per engine cycle can be controlled by control of the pressure, and hence density, of the steam supplied, and this control scheme may be preferred where steam supply pressure can be readily adjusted as, for example, where an external boiler is used whose pressure is well above that needed for the engine use. Alternatively, the steam mass delivered per engine cycle can be controlled by adjusting the length of stroke, and hence the steam displacement volume, of the piston, 84, in the cylinder, 85, as by use of the drive means of FIG. 6. This volume control scheme may be preferred where steam supply pressure is fixed as where a separately fired boiler is used as a steam supply means.

The steam to oxygen ratio, ap, and thus the steam to air ratio, within the pore spaces must be kept between that maximum value which chills and arrests the pore reactions of solid carbon and that minimum value at which porous burner volume temperatures exceed the material capabilities. The useable maximum value of ap must be less than about 1.7 at which point the net heat of the pore reactions becomes zero. The useable minimum value of ap depends upon the material used for the porous burner volume as shown in the following approximate tables of estimated values.

| Table of Minimum Values for Steam-Oxygen Ratio, ap, in Pores | | |
|---|---|---|
| Porous Burner Material | Approximate Maximum Useable Temperature | Approximate Minimum Useable ap* |
| Zirconia | 4200° F. | 0.35 |
| Alumina | 3540° F. | 0.58 |
| Silica | 2950° F. | 0.80 |
| Porcelain | 2185° F. | 1.10 |

*at engine CR of 12

The actual design values of steam oxygen ratio are best determined experimentally at either the minimum useable value for the porous burner material used or at that higher value yielding best engine efficiency. To hold the steam oxygen ratio at the design values a steam air proportioner device can be used. For example, a steam flow control device of prior art type can proportion steam flow to engine intake air density and in this way chosen values of steam oxygen ratio can be maintained.

Where fuels of high cetane number, and hence easily compression ignited, are being used engine starting can be achieved with cranking alone as is common for most conventional diesel engines. However, many high viscosity residual type fuels are of very low cetane number and difficult to start when cold. For these latter cases use of a special, high cetane number, starting fuel may be preferred with the special starting fuel being used alone during starting and warmup. For example, the special starting fuel can be admitted to the control fuel quantity controller, 9, of FIG. 1, via the start fuel supply line, 64, by turning the fuel selector valve, 65, thereto from the running fuel supply line, 66. Alternatively, the special starting fuel can be blended into the running fuel in an engine day tank until the engine is started and warmed up.

When the engine is running on volatile fuels which form little or no solid carbon deposit in the pore spaces, the engine can be stopped by stopping the fuel pouring as is common for conventional diesel engines. However, when fuels are being used which form a large deposit of solid carbon in the pore spaces, the engine will not stop when fuel pouring ceases but will continue to run for some time on the solid carbon deposits. Under these conditions, quick engine stopping can be achieved by greatly reducing the oxygen quantity in the engine intake gases either by throttling or by recirculating exhaust gas into the engine intake. An example of such an exhaust gas recirculation system for engine stopping is shown in FIG. 7 comprising an intake selector valve, 67, with handle, 68, an exhaust selector valve, 69, with handle, 70, and a crossover pipe, 71, connecting between the intake selector valve, 67, and the exhaust selector valve, 69. For normal engine running, these selector valves, 67, 69, are positioned as shown in solid outline in FIG. 7, and engine exhaust gas from the engine exhaust pipe, 42, passes via the pipe, 72, through the exhaust bypass valve, 58, to the gas turbine, 54, which drives the intake air supercharger, 55, and is discharged via the pipe, 73, whereas the intake air entering the supercharger, 55, via the pipe, 56, passes from the supercharger through the throttle valve, 57, and into the engine intake air port, 41. When the engine is to be stopped, the selector valves, 67, 69, are moved by the handles, 68, 70, into the positions shown in dashed outline in FIG. 7, and engine exhaust gas from the engine exhaust pipe, 42, passes via the crossover pipe, 71, into the engine intake air port, 41, and the engine stops since almost no oxygen will then be present in the cylinder gases. Alternatively, those engines running on the solid carbon deposited inside the pore spaces can be stopped by admitting excess steam into the engine cylinder. The endothermic steam to carbon reaction will chill down these carbon deposits below their rapid burning temperature and the engine will stop.

The char and oil burning engines described in the cross-referenced related applications can utilize the same combustion principle and the same kinds of fuels as the porous burner diesel engine described herein. Additionally, these char and oil burning engines can operate on solid char fuels of high ash content alone and this is an advantage of these char burning engines over the porous burner engines described herein. On the other hand, the char burning engines require a refuel mechanism of appreciable mechanical complexity and, if high ash char fuels are to be used, an additional ash removal mechanism, also complex, is needed whereas the porous burner engines described herein do not require these mechanically complex and costly elements and this is the primary advantage of these porous burner engines over the char burning engines. Char burning engines are likely to be used in those applications, such as railroad locomotives and tugboats, where the lower cost of solid char fuels more than offsets the higher engine cost and complexity. Porous burner engines are likely to be used in those applications, such as truck and bus engines, where the convenience of refueling with a pourable fuel is important enough to offset the higher fuel cost. In those engine applications where there is no intention of using solid char fuels alone, the porous burner engine will be preferred over the char burning engine as being mechanically simpler and less costly.

The Meurer diesel engine, as described for example on pages 591 to 593 of "Internal Combustion Engines," by E. F. Obert, 3rd edition, Int'l. Textbook Co., 1968, also deliberately pours or sprays an appreciable portion of liquid fuel upon a solid surface of the engine combustion chamber, specifically a recess within the engine piston crown. The porous burner diesel engines of my invention differ from this Meurer diesel engine is several ways of which the following are examples:

a. In the porous burner engine the fuel is spread out over a large internal pore area of the porous burner volume, whereas in the Meurer diesel engine that fuel not atomized is spread out over a small external area of a non-porous piston. In consequence, the fuel on the surface is spread out over a much larger area in the porous burner engine than in the Meurer diesel engine. As a result, the porous burner engine can efficiently use fuels which form a solid carbon deposit during combustion because this solid carbon deposit, being spread out over a large area, can be oxidized and gasified quickly. The Meurer diesel engine cannot efficiently use such solid carbon deposit forming fuels since the solid carbon is not spread out over a large area.

b. In the porous burner engine the solid carbon deposit can be burned over a time period of several engine cycles by changing, as between engine cycles, the portion of the external area of the porous burner volume upon which the fresh fuel is poured. By thus changing the poured upon area that solid carbon within non poured upon regions has full access to the air compressed into those regions. In the Meurer diesel engine the fresh fuel is always poured upon the same area of the piston and hence upon whatever solid carbon deposit is formed. Thus, any solid carbon deposit formed from the fuel in the Meurer diesel engine must compete with fresh hydrocarbon fuel vapors and gaseous partial oxidation products for the oxygen available adjacent the solid carbon deposit and these fuel vapors and oxidation products will win this competition. For this reason, the Meurer diesel engine is not suited to using high viscosity residual fuels which form solid carbon deposits during combustion whereas the porous burner engines can readily burn such fuels.

c. The Meurer diesel engine is intended to use wholly distillate fuels which evaporate fully from the piston crown and mix with air and burn fully during each engine cycle, and to do so in a quiet and efficient manner. The porous burner engines of this invention are intended to use high viscosity residual fuels which form solid carbon deposits and to fully burn these solid carbon deposits over several engine cycles. Hence, these two different engines are intended to use different fuels, in different applications by use of different engine apparatus.

Having thus described my invention, what I claim is:

1. A porous burner diesel engine comprising:

an internal combustion engine mechanism comprising cylinders, pistons operative within said cylinders, piston crowns on the compressing side of said pistons, and a combustion chamber space in each such cylinder fully enclosed by said piston crowns and a portion of the walls of said cylinder when said piston crowns and cylinder enclose the smallest such space during the engine compression process;

at least one porous burner volume in each of said cylinders, said burner volume being made from a porous, solid, high-temperature material, said porous burner volume being secured within said combustion chamber space and occupying a fractional portion thereof, said fractional portion being less than one and greater than zero;

means for spreading poured liquid fuel over interior surface areas of said porous burner volume so that, poured fuel is forced inside said porous burner volume during compression processes, gas or liquid can flow only into said porous burner volume during compression processes and can flow only out of said porous burner volume during expansion processes and cannot flow entirely through said porous burner volume, whereby unburned solid portions of said poured fuels are retained within said porous burner volume between engine cycles, said means for spreading comprising:

said porous burner volume comprising an external surface area consisting of two portions, a sealed area largely sealed to prevent gas or liquid flow therethrough during the engine compression and expansion processes, and an unsealed, poured upon area, through which gas or liquid flow can occur during the engine compression and expansion processes, all of said poured upon area for each burner volume being in contact with a single, undivided portion of said combustion chamber space;

means for pouring a volume of said liquid fuel upon a portion of said poured upon area, said pouring commencing after the commencement of the engine intake process for each engine cycle, said pouring being stopped prior to the end of the engine compression process for that same engine cycle;

means for controlling the quantity of liquid fuel poured upon the external surface of said porous burner volume during each engine cycle.

2. A porous burner diesel engine comprising:

an internal combustion engine mechanism comprising cylinders, pistons operative within said cylinders, piston crowns on the compressing side of said pistons, and a combustion chamber space in each such cylinder fully enclosed by said piston crowns and a portion of the walls of said cylinder when said piston crowns and cylinder enclose the smallest such space during the engine compression process;

at least one porous burner volume in each of said cylinders, said burner volume being made from a porous, solid, high-temperature material, said porous burner volume being secured within said combustion chamber space and occupying a fractional portion thereof, said fractional portion being less than one and greater than zero;

means for spreading poured liquid fuel over interior surface areas of said porous burner volume so that, poured fuel is forced inside said porous burner volume during compression processes, gas or liquid can flow only into said porous burner volume during compression processes and can flow only out of said porous burner volume during expansion processes and cannot flow entirely through said porous burner volume, whereby unburned solid portions of said poured fuels are retained within said porous burner volume, said means for spreading comprising:

said porous burner volume comprising an external surface area consisting of two portions, a sealed area largely sealed to prevent gas or liquid flow therethrough during the engine compression and expansion processes, and an unsealed, poured upon area, through which gas or liquid flow can occur during the engine compression and expansion processes, all of said poured upon area for each burner volume being in contact with a single, undivided portion of said combustion chamber space;

means for pouring a volume of liquid fuel upon a portion of said poured upon area, so that said portion of said poured upon area changes between engine cycles in order that unburned retained solid portions of said poured fuels are contacted with air for several engine cycles in order to complete their burning, said pouring commencing after the commencement of the engine intake process for each engine cycle, said pouring being stopped prior to the end of the engine compression process for that same engine cycle;

means for controlling the quantity of liquid fuel poured upon the external surface of said porous burner volume during each engine cycle so that engine torque is controlled.

3. A porous burner diesel engine comprising:

an internal combustion engine mechanism comprising cylinders, pistons operative within said cylinders, piston crowns on the compressing side of said pistons, and a combustion chamber space in each such cylinder fully enclosed by said piston crowns and a portion of the walls of said cylinder when said piston crowns and cylinder enclose the smallest such space during the engine compression process;

at least one porous burner volume in each of said cylinders, said burner volume being made from a porous, solid, high-temperature material, said porous burner volume being secured within said combustion chamber space and occupying a fractional portion thereof, said fractional portion being less than one and greater than zero;

means for spreading poured liquid fuel over interior surface areas of said porous burner volume so that, poured fuel is forced inside said porous burner volume during compression processes, gas or liquid can flow only into said porous burner volume during compression processes and can flow only out of said porous burner volume during expansion processes and cannot flow entirely through said porous burner volume, whereby unburned solid portions of said poured fuels are retained within said porous burner volume, said means for spreading comprising:

said porous burner volume comprising an external surface area consisting of two portions, a sealed area largely sealed to prevent gas or liquid flow therethrough during the engine compression and expansion processes, and an unsealed, poured upon area, through which gas or liquid flow can occur during the engine compression and expansion processes, all of said poured upon area for each burner volume being in contact with a single, undivided portion of said combustion chamber space;

means for pouring a volume of liquid fuel upon a portion of said poured upon area, so that said portion of said poured upon area changes between engine cycles in order that unburned retained solid portions of said poured fuels are contacted with air for several engine cycles in order to complete their burning, said pouring commencing after the commencement of the engine intake process for each engine cycle, said pouring being stopped prior to the end of the engine compression process for that same engine cycle;

means for controlling the quantity of liquid fuel poured upon the external surface of said porous burner volume during each engine cycle and means for controlling the quantity of air entering the engine cylinder during each engine intake process, so that engine torque is controlled.

4. A porous burner diesel engine as described in claim 3 and further comprising:

means for coupling said means for controlling the quantity of air to said means for controlling the quantity of liquid fuel, so that the ratio of air quantity to fuel quantity per engine cycle has essentially the same set value whenever the engine is operating at essentially the same condition;

means for sensing the accumulation of solid carbon within the pores of said porous burner volume;

control means operative upon said means for coupling, and connected to said means for sensing carbon accumulation as an input, so that the ratio of air quantity to fuel quantity per engine cycle is controlled to a value equal to the sum of a set value and a correction value, said set value being essentially the same whenever the engine is operating at essentially the same condition, said correction value increasing the ratio of air to fuel in proportion to the quantity of carbon accumulated within the pores of said porous burner volume.

5. A porous burner diesel engine as described in claim 1, 2, 3, or 4, and further comprising:

means for generating steam and delivering said steam into the pore spaces within said porous burner volume at some time during the engine intake and compression processes;

means for controlling the quantity of steam delivered to the pore spaces within said porous burner volume so that the ratio of steam quantity to air quantity within the pore spaces has essentially the same set value whenever the engine is operating at essentially the same condition.

6. A porous burner diesel engine as described in claim 1, 2, 3, or 4, and further comprising:

means for supplying steam;

means for delivering said steam equally into each engine cylinder commencing after commencement of the engine compression process, and stopping prior to the end of the engine compression process;

means for timing and positioning said steam delivery so that it occurs largely into that engine intake air mass which goes inside the porous burner volume within the engine combustion chamber space;

means for controlling said delivered steam quantity to be approximately proportional to that engine intake air quantity which goes inside the porous burner volume.

7. A porous burner diesel engine as described in claim 1, 2, 3, or 4, and further comprising:

means for starting the engine;

means for stopping the engine.

8. A porous burner diesel engine as described in claim 1, 2, 3, or 4, and further comprising:

means for starting the engine by supplying an easily started fuel to said means for pouring a volume of liquid fuel, while the engine is being cranked for starting, and thereafter at least until the engine is warmed up;

means for stopping the engine by stopping the flow of liquid fuel to the engine cylinder, and by reducing the amount of oxygen in the engine intake gases.

9. A porous burner diesel engine as described in claim 1, 2, 3, or 4;

wherein said means for pouring a volume of liquid fuel upon a portion of the poured upon area of said porous burner volume, pours said fuel so that the amount of fuel poured upon a unit of area of said poured upon area is approximately constant.

10. A porous burner diesel engine as described in claim 1, 2, 3, or 4;

wherein said means for pouring a volume of liquid fuel upon a portion of the poured upon area of said porous burner volume, pours said fuel so that the amount of area poured upon is approximately constant.

11. A porous burner diesel engine as described in claim 1, 2, 3, or 4, and further comprising:

means for insulating said porous burner volume from the engine cylinder walls by a high temperature insulating material whose interior is essentially impenetrable by gas flow during engine compression or expansion processes.

12. A porous burner diesel engine as described in claim 1, 2, 3, or 4, wherein said high temperature material, of which the burner volume is made, is resistant to chemical attack by chlorine and bromine containing materials.

13. A porous burner diesel engine as described in claim 1, 2, 3, or 4, and further comprising:

means for starting the engine by supplying an easily started fuel to said means for pouring a volume of liquid fuel, while the engine is being cranked for starting, and thereafter at least until the engine is warmed up;

means for stopping the engine by stopping the flow of liquid fuel to the engine cylinder, and by increasing the flow of steam to the engine cylinder.

* * * * *

UNITED STATES PATENT AND TRADEMARK OFFICE
CERTIFICATE OF CORRECTION

PATENT NO. : 4381745

DATED : May 3, 1983

INVENTOR(S) : Joseph C. Firey

It is certified that error appears in the above-identified patent and that said Letters Patent is hereby corrected as shown below:

Column 8 line 21: change "zone" to -- zero --;

Column 11 line 58: change "buring" to -- burning --;

Column 11 line 64: change "of" to -- or --;

Signed and Sealed this

Eighteenth Day of October 1983

[SEAL]

Attest:

Attesting Officer

GERALD J. MOSSINGHOFF

Commissioner of Patents and Trademarks